(12) United States Patent
Reddy et al.

(10) Patent No.: US 7,620,978 B1
(45) Date of Patent: Nov. 17, 2009

(54) SECURELY PROPAGATING AUTHENTICATION IN AN ENSEMBLE OF DEVICES USING SINGLE SIGN-ON

(75) Inventors: Prakash Reddy, Fremont, CA (US); James A. Rowson, Fremont, CA (US); Eamonn O'Brien-Strain, San Mateo, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 860 days.

(21) Appl. No.: 11/193,707

(22) Filed: Jul. 29, 2005

(51) Int. Cl.
*G06F 21/00* (2006.01)
*H04L 9/00* (2006.01)
(52) U.S. Cl. .................. 726/8; 726/2; 726/4; 713/168
(58) Field of Classification Search .............. 726/8, 726/2, 4; 713/168
See application file for complete search history.

(56) References Cited

U.S. PATENT DOCUMENTS 6,351,468 B1 * 2/2002 LaRowe et al. ............ 370/449
6,804,232 B1 * 10/2004 Donaghey ................. 370/389
7,219,154 B2 * 5/2007 Blakley et al. ............ 709/229

* cited by examiner

*Primary Examiner*—Carl Colin
*Assistant Examiner*—Lisa Lewis

(57) ABSTRACT

A single sign-on technique suitable for a network of devices with no centralized device or synchronized clocks such as a personal area network (PAN) is described. Responsive to a user signing-on to a first device via its user interface, the first device securely propagates authentication of the user for enabling one or more other devices in the network, each for a near-expiry time period measured from the device specific time of the respective device; thus providing for expiration of authentication to minimize how long data is vulnerable in case a device is lost or stolen. Described also is a device enabling protocol using authentication accumulation to secure against threats from a rogue device pretending to be another device in the network such as in man-in-the-middle and replay attacks.

13 Claims, 7 Drawing Sheets

400

| Alice | | Bob |
|---|---|---|
| Known: ($I_A$, $K_G$, $t_E$, $K_E$) | | Known: ($I_B$, $K_G$) |
| $n_A \leftarrow$ random() | | |
| $m_1, a_1 \leftarrow$ pack($K_G$, $n_A \| I_A$) | | |
| | "enable", $m_1$, $a_1$ $\longrightarrow$ broadcast | |
| | | $n_A \| I_A \leftarrow$ unpack($K_G$, $m_1$) |
| | | $n_B \leftarrow$ random() |
| | | $t_B \leftarrow$ localTime() |
| | | $m_2, a_2 \leftarrow$ pack($K_G$, $n_A \| n_B \| t_B, a_1$) |
| | $I_B, m_2, a_2$ $\longleftarrow$ to $I_A$ | |
| $n_A' \| n_B \| t_B \leftarrow$ unpack($K_G$, $m_2, a_1$) | | $k_{AB} \leftarrow$ h($K_G$, $a_1 \| a_2$) |
| assert($n_A' = n_A$) | | |
| $k_{AB} \leftarrow$ H($K_G$, $a_1 \| a_2$) | | |
| $t_E' \leftarrow t_B + t_E$ - localTime() | | |
| $m_3, a_3 \leftarrow$ pack($k_{AB}$, $n_B \| t_E' \| K_E, a_2$) | | |
| | $I_A, m_3, a_3$ $\longrightarrow$ to $I_B$ | |
| | | $n_B' \| t_E \| K_E \leftarrow$ unpack($k_{AB}$, $m_3, a_2$) |
| | | assert($n_B' = n_B$) |

FIG. 4

SECURELY PROPAGATING AUTHENTICATION IN AN ENSEMBLE OF DEVICES USING SINGLE SIGN-ON

BACKGROUND

Field of the Invention

The invention relates generally to single sign-on techniques in which a user's authentication for one computer or application is used to authenticate the user with another computer or application.

Available single sign-on protocols typically rely on one or more of the following requirements: a centralized authentication server, a known network configuration of devices and/or services, or a synchronized clock for all devices and/or services in the network configuration. For example, the Kerberos protocol for single sign-on requires a synchronized clock among all the participating devices and/or services and a central authentication server, and the Microsoft® Passport protocol relies on a centralized Passport server for client authentication.

These single sign-on protocols are not suited to a decentralized network of unsynchronized information technology devices. One example of such a decentralized network lacking synchronized clocks is a personal area network (PAN). As the name implies, a PAN includes interconnected information technology devices which are within the range of an individual person, typically within a range of no more than ten (10) meters. (See www.whatis.com for the definition of a personal area network.) For example, a person traveling with a laptop, a personal digital assistant (PDA), and a portable printer could interconnect them without having to plug anything in, using some form of wireless technology. Typically, this kind of personal area network could also be interconnected with or without wires to the Internet or other networks.

These single sign-on approaches are not well-suited to a decentralized personal area network (PAN) of information technology devices in which no device acts as a central authentication server and clocks on the devices are not synchronized. Often membership in the PAN is obtained simply by being physically present in a range of a communication connection using a wireless protocol, for example, Bluetooth or a wireless access point using a wireless protocol like a version of 802.11. Typically, in a PAN, no member of the ensemble knows the identities of all the other ensemble members. Additionally, the networked ensemble can be constantly changing wherein new devices join, and older devices leave, and there is no pre-established addressing scheme. Signing-on to all these devices, particularly as a user moves around, can be burdensome.

A PAN also typically uses a broadcast capability for communication among the devices which increases the risk of security attacks in which a device not intended to be a part of the PAN, hereafter called a rogue device, pretends to be one of the ensemble devices. Some examples of such attacks are a man-in-the-middle attack in which an attacker communicates with two devices pretending to each that it is the other, and a replay attack in which the attacker records the sequence of communication between two devices and replays it back later pretending to be one of the devices. Of course, another security threat for a PAN is physical removal of a device from the PAN through theft or loss and an attempt by an unauthorized user to read its data.

It is desired to provide a single-sign on protocol that makes the authentication of an ensemble of devices as simple as the authentication of one device while providing a high level of security in a decentralized, unsynchronized ensemble of networked devices.

SUMMARY

The present invention provides one or more solutions for securely propagating authentication between devices using single sign-on in a decentralized network of unsynchronized information technology devices in accordance with one or more embodiments of the present invention. In one embodiment of a solution in accordance with the present invention, responsive to a first device receiving valid user authentication information from user input, the first device selects a far-expiry time period determined relative to its device specific time. Upon expiration of this far-expiry time period, the first device is no longer in an enabled state for accessing data as allowed for the valid user authentication information. The first device enables a second device to an enabled state for accessing data as allowed for a user authenticated by the first device for a near-expiry time period determined relative to a device specific time of the second device. The second device transitions to a non-enabled state upon expiration of the near-expiry time period which terminates no later than the end of the far-expiry time period.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 4 is a table for illustrating a single sign-on protocol for securely propagating authentication between devices using single sign-on in a decentralized network of unsynchronized information technology devices in accordance with an embodiment of the present invention.

The figures depict embodiments of the present invention for purposes of illustration only. One skilled in the art will readily recognize from the following discussion that other embodiments of the structures and methods illustrated herein may be employed without departing from the principles of the invention described herein.

DETAILED DESCRIPTION

Figure 1:
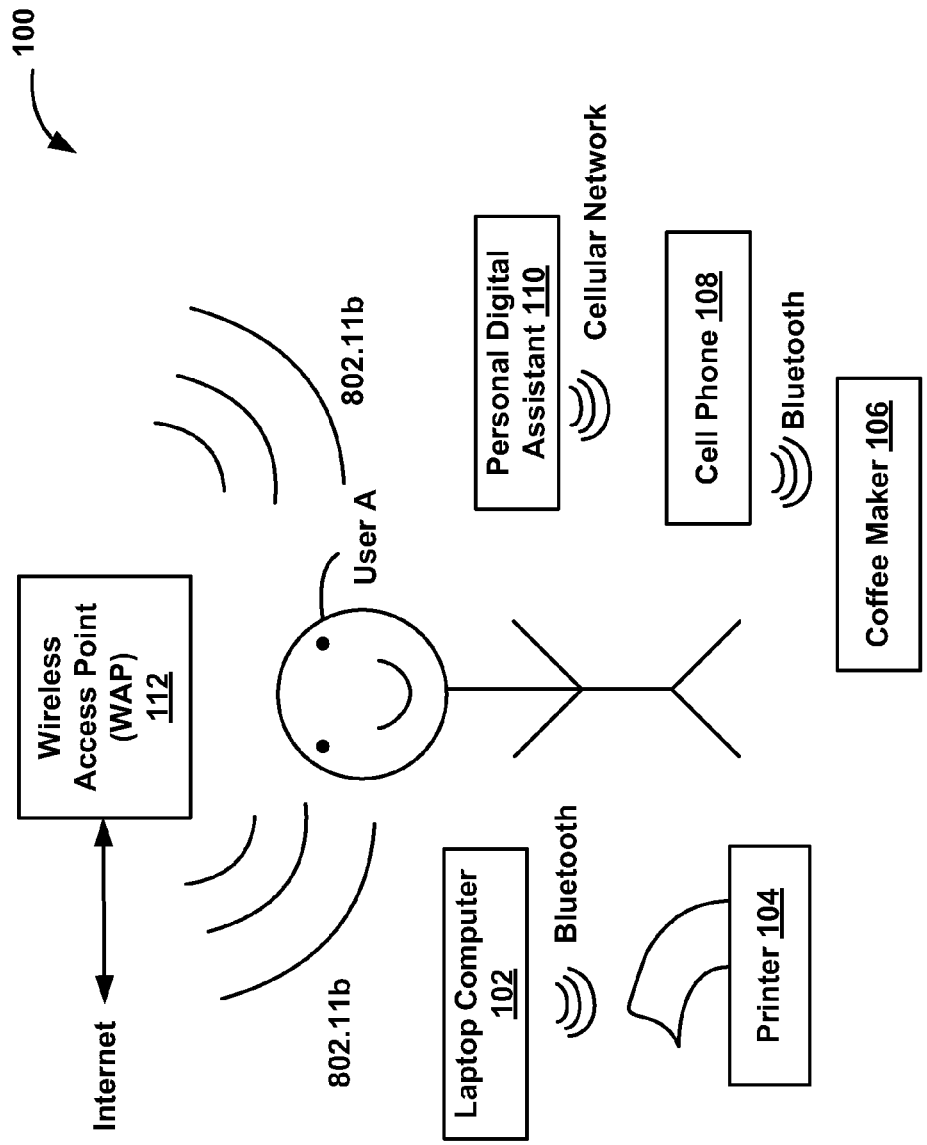
FIG. 1 is an architectural diagram of a PAN as an example of a decentralized network of unsynchronized information technology devices in which context a system for securely propagating authentication between devices using single sign-on can operate in accordance with one or more embodiments of the present invention.

FIG. 1 is an architectural diagram of a PAN 100 as an example of a decentralized network of unsynchronized information technology devices in which context a system for securely propagating authentication between devices using single sign-on can operate in accordance with one or more embodiments of the present invention. The aim of a single sign-on scheme is to provide security and at the same time make it convenient for people to use an ensemble of devices by signing-on to one device. The ensemble of devices in the PAN include a laptop computer 102 which communicates via a Bluetooth protocol in this example with a printer 104 and which communicates via a wireless access point 112 via 802.11b wireless protocol with a personal digital assistant (PDA) 110. The PDA 110 communicates via a cellular network connection with a cellular telephone 108 which in turn communicates via Bluetooth with a coffee maker 106. As is typical for these devices, in this example, the laptop computer 102, the PDA 110 and the cell phone 108 include physical interface (e.g., a display and input devices such as keyboards, keypads, a biometric information sensor or a pointing device (e.g., mouse, stylus)) through which User A can directly sign-on to any of them by entering authenticating information (e.g., a username and password, or a thumbprint.) The printer 104 can also have a physical user interface through which User A can sign-on to it to start the secure propagation to other devices as well. In this example, the coffee maker 106 is Bluetooth enabled for control by another device, in this example the cell phone 108, but does not have a physical user interface such as a display and an input device which can accept authentication information from the user. Thus User A cannot directly sign-on to the coffee maker 106, but the cell phone 108 can enable the coffee maker to perform tasks as allowed for User A by initiating a sign-on protocol with the coffee maker 106.

This example also illustrates a network in which each of the devices does not always detect the presence of each of the other devices in the network. For example, the printer 104 can be out of range for the Bluetooth connections of the coffee maker 106 and the PDA 110, but its presence has been detected by the laptop computer 102. The PDA 110 communicates with the laptop computer 102 via the wireless access point 112. In this set-up, the PDA can be aware of the laptop's 102 connection to the printer 104 if the laptop 102 makes that information available after completing an authentication protocol with the PDA 110. In one example, User A signs-on to the laptop computer 102 which enables the printer 104 and the PDA 110 via a single sign-on authentication protocol. The PDA 110 in turn enables the cell phone 108 via the single sign-on authentication protocol over a cell network connection, and the cell phone 108 in turn enables the coffee maker 106 via the single sign-on authentication protocol over the Bluetooth connection.

Figure 2:
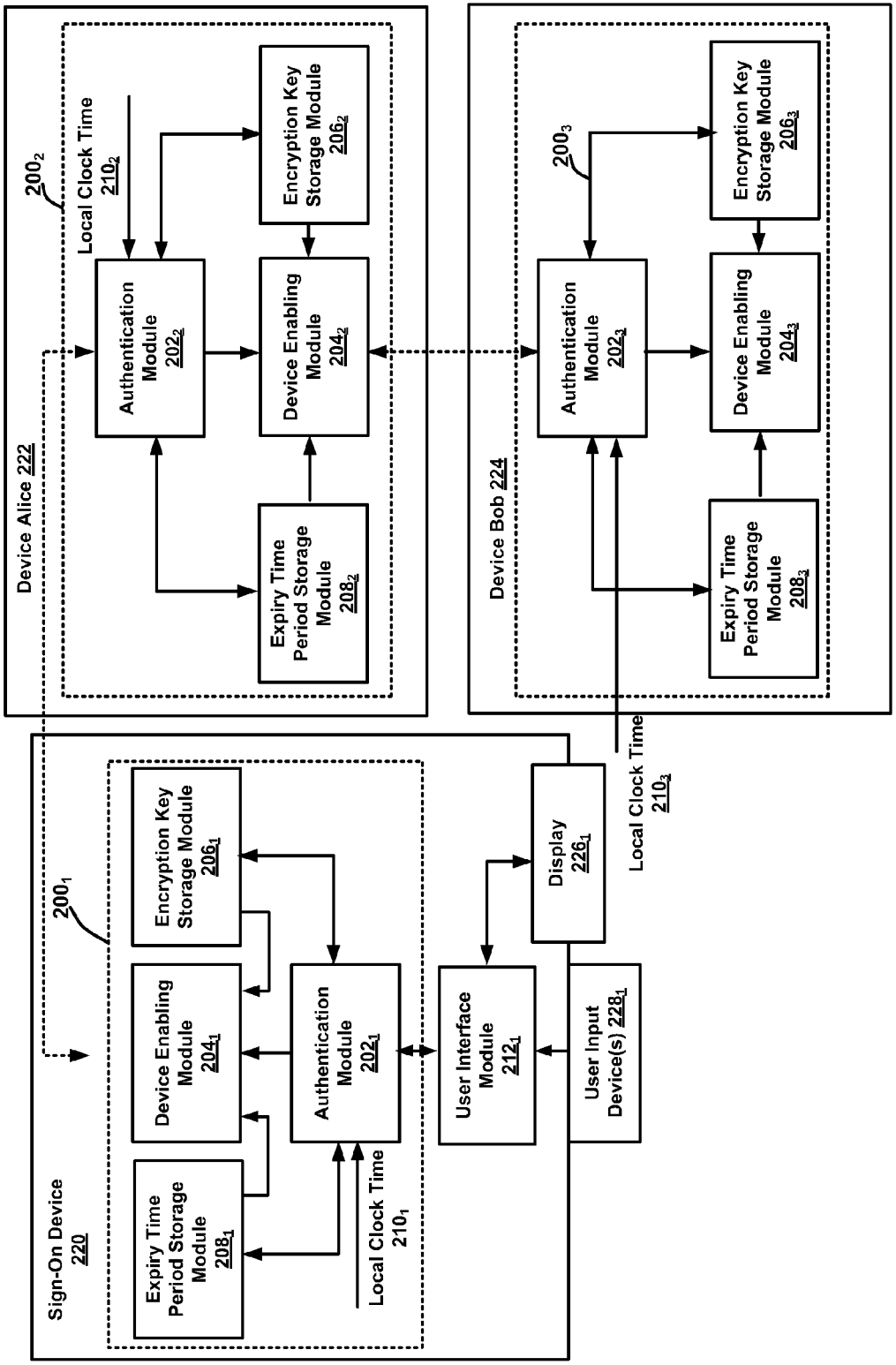
FIG. 2 is a block diagram of a system for securely propagating authentication between devices using single sign-on in a decentralized network of unsynchronized information technology devices in accordance with an embodiment of the present invention.

FIG. 2 is a software architecture block diagram of a system $200_N$ for securely propagating authentication between devices using single sign-on in a decentralized network of unsynchronized information technology devices in accordance with an embodiment of the present invention. As is typical for information technology devices, each of the devices in FIG. 2 includes a processor and therefore a clock, memory and a communication interface (e.g., wired or wireless) for communicating with at least one other device. The devices include a sign-on device 220, Device Alice 222 and Device Bob 224 each including an instantiation of the system embodiment $200_N$. Alice and Bob are names that are typically used to refer to roles in a protocol played by participant devices when illustrating the protocol. The Sign-on Device 220 represents a device having a physical user interface which is enabled by user entered authentication information. Device Alice 222 represents a device automatically enabled by another device, in this example the Sign-on Device 220. Device Bob 224 represents another device automatically enabled in turn by Device Alice 222. An automatically enabled device is one which is enabled for authentication information entered into another device using a user input device such as Sign-on Device 220. Device Bob 224 or Device Alice 222 can include or not include a physical user interface capable of accepting user entered authentication information.

The system $200_N$ for securely propagating authentication between devices using single sign-on in a decentralized network of unsynchronized information technology devices comprises an authentication module $202_N$ communicatively coupled to a device enabling module $204_N$, an encryption key storage module $206_N$ and an expiry time storage module $208_N$, both of which storage modules are accessible to the authentication module $202_N$ and the device enabling module $204_N$. As illustrated in the Sign-On device 220, for a device which can receive input via user input device(s) $228_1$, the authentication module $202_1$ is communicatively coupled to a user interface module $212_1$ for receiving user input and for displaying a request for user authentication information on a device display $226_1$. In the case of the sign-on device 220, the authentication module $202_1$ authenticates the entered user authentication information. For example, it can perform a forward hash chain or a reverse hash chain algorithm using one or more keys stored in the encryption key storage module $206_1$ to verify the entered information. After authentication, the authentication module $202_1$ determines a far-expiry time as measured from its local clock time $210_1$ for a predetermined or user customized far-expiry time period stored in the expiry time storage module $208_1$, stores the far-expiry time, and sets a timer to notify it when the far-expiry time period expires. Upon expiration, the sign-on device 220 requires re-entry of the user authentication information again in order to enter an enabled state in which data associated with the user authentication information can be accessed. The authentication module $202_1$ notifies the device enabling module $204_1$ of sign-on completion.

The device enabling module $204_1$ initiates a secure single sign-on authentication protocol using one or more encryption keys stored in the encryption key storage module $206_1$ with an authentication module $202_N$ of another device detected or known in the network for enablement of the other device. For discussion purposes, Device Alice 222 is detectable by the Sign-on Device 220. After a successful secure authentication protocol with Device Alice 222, the device enabling module 204$_1$ generates a near-expiry time (e.g., which can also be customized by the signed-on user) for Device Alice 222 expressed in terms of the local clock time 210$_2$ for Device Alice 222, and sends the near-expiry time to Alice's authentication module 202$_2$ which stores the near-expiry time in its expiry time period storage module 208$_2$.

In one embodiment, the far-expiry time period for the sign-on device is longer than a near-expiry time period for devices automatically authenticated by the sign-on device. For example, the far-expiry time period typically ranges from an hour to a day, while a near-expiry time period is on the order of minutes to hours. In an alternate embodiment, the near-expiry time period can end with the far-expiry time period if desired. However, the shorter near-time expiry time period provides added security for protecting data on a lost or stolen device by minimizing how long data is vulnerable in case a device is lost or stolen.

Each automatically authenticated device would be required to re-authenticate much more frequently than the sign-on device. Devices re-authenticate themselves automatically after the near-expiry time by participating in the single sign-on authentication protocol again. For example, the authentication module 202$_2$ transitions Device Alice 222 to a non-enabled state, and Device Alice 222 remains non-enabled until an enabled device automatically initiates the protocol. In an alternate embodiment, an automatically authenticated device can request to re-authenticate in a short time period near the end of the near-expiry time.

In one embodiment, a device enabling module 204$_N$ periodically initiates the single sign-on authentication protocol. For example, Device Alice can periodically check for the presence of other non-enabled devices during its near-expiry time period and thus authenticate new devices and re-authenticate devices which may have left the ensemble and come back into the ensemble of networked devices due to the user's movements.

An automatically enabled device such as Device Alice 222 can initiate the secure single sign-on authentication protocol with other devices it has detected. For discussion purposes, non-enabled Device Bob is out of communication range for the Sign-on Device 220 but within communication range of automatically enabled Device Alice 222. Alice's device enabling module 204$_2$ initiates the secure single sign-on authentication protocol with Device Bob 224 using one or more keys stored in its encryption key storage module 206$_2$. After a successful secure authentication protocol, the device enabling module 204$_2$ generates a near-expiry time for Device Bob 224 expressed in terms of the local clock time 210$_3$ for Device Bob 224, and sends the near-expiry time to Bob's authentication module 202$_3$ which stores the near-expiry time in its expiry time period storage module 208$_3$.

The near-expiry time for Device Bob 224 does not extend beyond the expiry time for Device Alice 222. For example, if at 1:00 P.M., in the local time for Device Alice 222, the near-expiry time is 1:30 PM and Device Alice 222 enables Device Bob 224 later at 1:10 PM, Device Alice sets Device Bob's near-expiry to be 20 minutes later in Bob's local time. Each automatically authenticated device then has its own version of the near-expiry time which does not extend beyond the expiry time of the device that enabled it. The expiry time received by Device Bob 224 may be slightly inaccurate because of network delays and other latencies in the protocol implementation. However, any inaccuracy does not extend Bob's near-expiry time to being later than the near-expiry time of Device Alice 222 or the far-expiry time of the Sign-on Device 220.

Each of the modules illustrated in FIG. 2 or a portion thereof can be implemented in software suitable for execution on a processor and storage in a computer-usable medium, hardware, firmware or any combination of these. Computer-usable media include any configuration capable of storing programming, data, or other digital information. Examples of computer-usable media include various memory embodiments such as random access memory and read only memory, which can be fixed in a variety of forms, some examples of which are a hard disk, a disk, flash memory, or a memory stick.

Figure 3A:
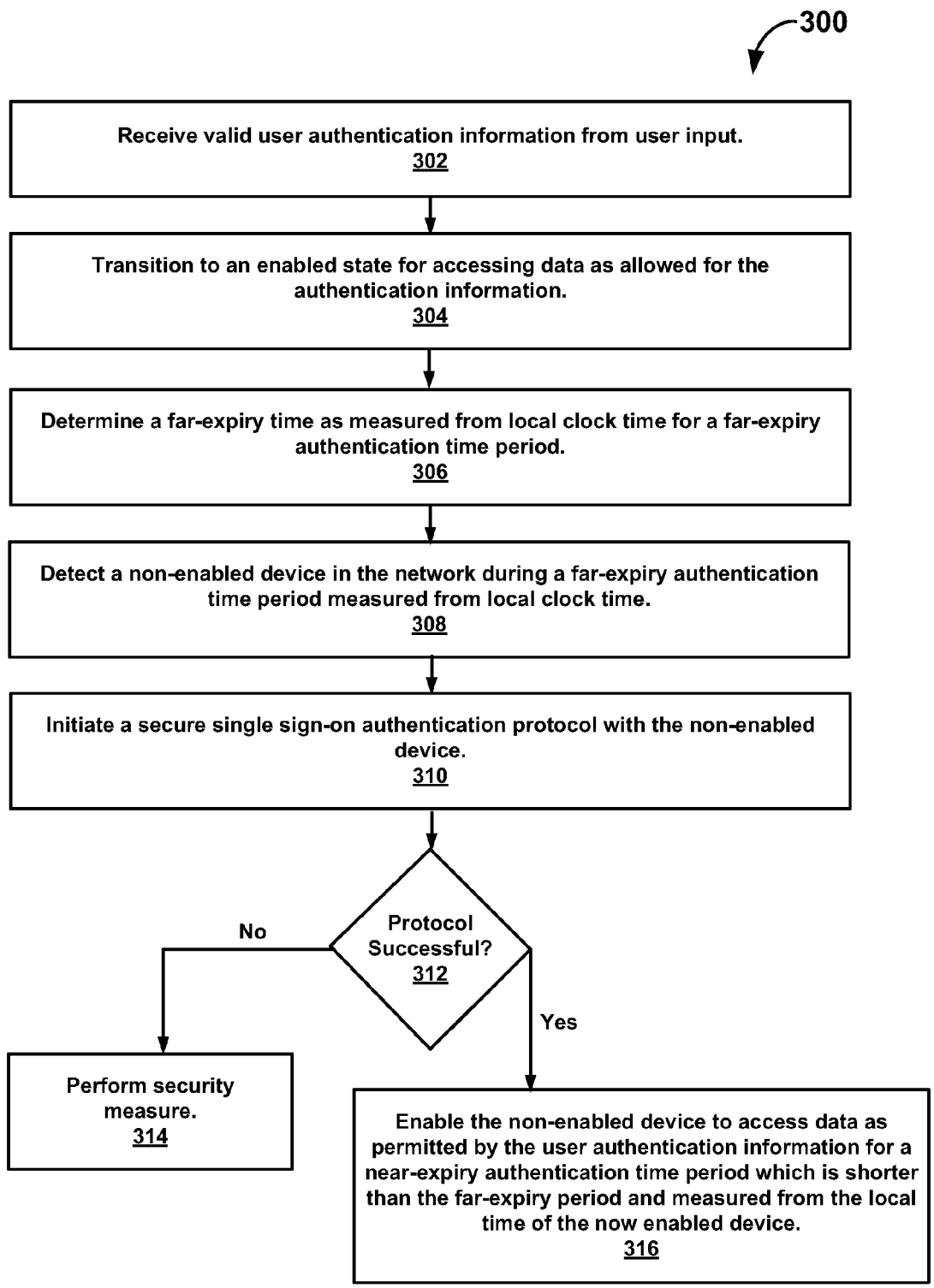
FIG. 3A is a flow chart diagram of a method for securely propagating authentication between devices using single sign-on in a decentralized network of unsynchronized information technology devices from the perspective of a sign-on device 220 in accordance with an embodiment of the present invention.

FIG. 3A is a flow chart diagram of a method for securely propagating authentication between devices using single sign-on in a decentralized network of unsynchronized information technology devices from the perspective of a sign-on device 220 in accordance with an embodiment of the present invention. For illustrative purposes only and not to be limiting thereof, the method embodiment 300 of FIG. 3A is discussed from the perspective of the Sign-on Device 220 in the context of the system embodiment of FIG. 2. The authentication module 202$_1$ receives 302 valid user authentication information from user input, transitions 304 to an enabled state for accessing data as allowed for the authentication information, and determines 306 a far-expiry time as measured from local clock time for a far-expiry authentication time period. The device enabling module 204$_1$ detects 308 via a communication interface (See FIG. 1, e.g., Bluetooth protocol connection, cellular network protocol connection, 802.11(b) protocol connection) a non-enabled device (e.g., Device Alice 222) in the network during a far-expiry authentication time period measured from local clock time 210$_1$, and initiates 310 a secure single sign-on authentication protocol with the non-enabled device. Responsive to determining 312 an unsuccessful protocol, the device enabling module 204$_1$ performs 314 a security measure. An example of a security measure is ignoring a request for data from the non-enabled device. Responsive to determining 312 a successful protocol, the device enabling module 204$_1$ enables 316 the non-enabled device to access data as permitted by the user authentication information for a near-expiry authentication time period which is shorter than the far-expiry period and measured from the local time of the now enabled device (e.g., Device Alice 222.)

Figure 3B:
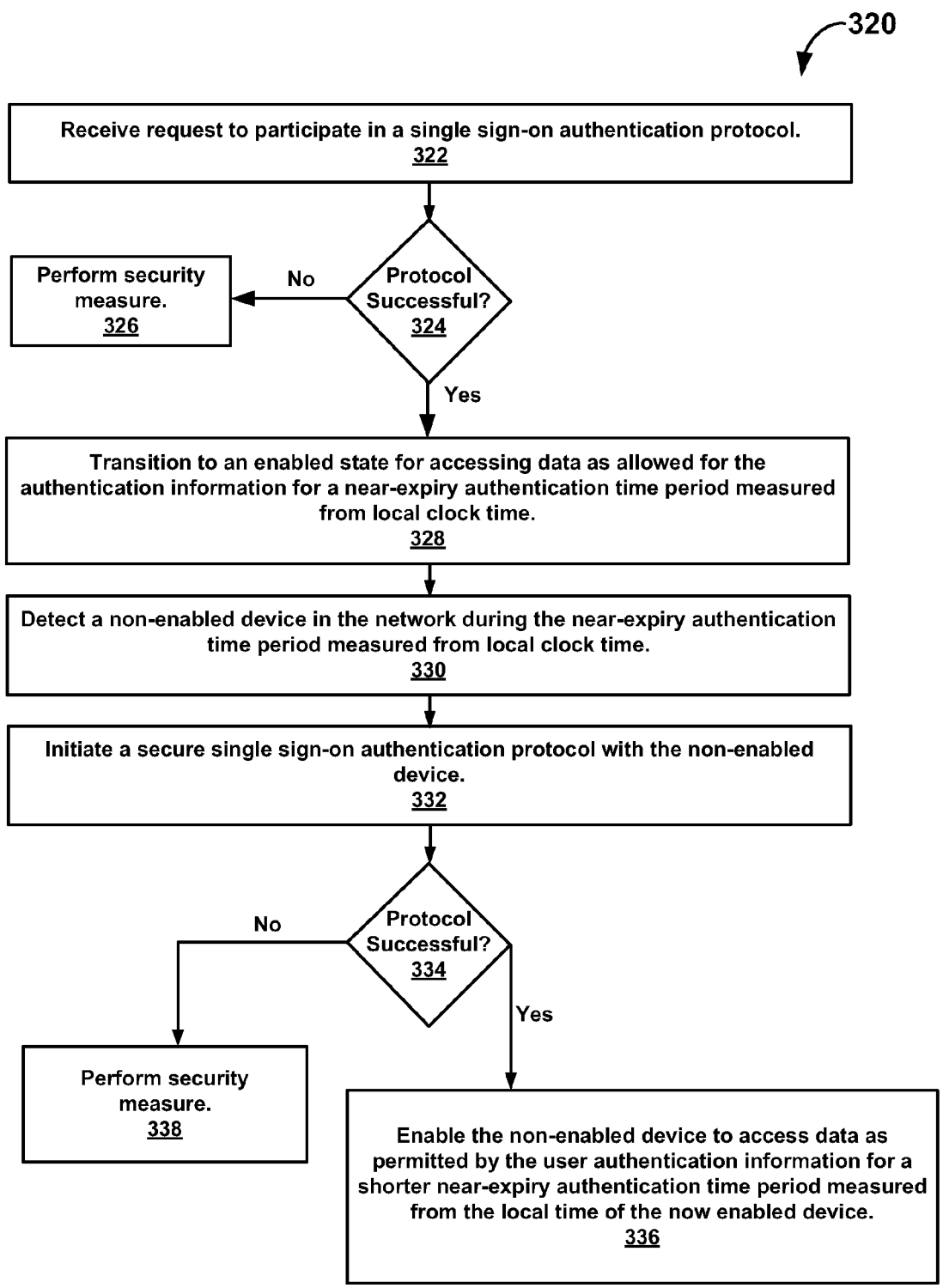
FIG. 3B is a flow chart diagram of a method for securely propagating authentication between devices using single sign-on in a decentralized network of unsynchronized information technology devices from the perspective of a device being automatically enabled in accordance with an embodiment of the present invention.

FIG. 3B is a flow chart diagram of a method for securely propagating authentication between devices using single sign-on in a decentralized network of unsynchronized information technology devices from the perspective of a device being automatically enabled in accordance with an embodiment of the present invention. For illustrative purposes only and not to be limiting thereof, the method embodiment 320 of FIG. 3B is discussed from the perspective of Device Alice 222 in the context of the system embodiment of FIG. 2. The authentication module 202$_2$ receives 322 a request to participate in a single sign-on authentication protocol 324, for example, from the device enabling module 204$_1$ of the Sign-on Device 220. Responsive to an unsuccessful protocol, the authentication module 202$_2$ performs 326 a security measure. Responsive to a successful protocol, the authentication module 202$_2$ transitions 328 Device Alice 222 to an enabled state for accessing data as allowed for the authentication information for a near-expiry authentication time period measured from local clock time 2102. The device enabling module 204$_2$ detects 330 via a communication interface a non-enabled device (e.g., Device Bob 224) in the network during the near-expiry authentication time period measured from local clock time $210_2$, and initiates 332 a secure single sign-on authentication protocol with the non-enabled device. Responsive to determining 334 an unsuccessful protocol, the device enabling module $204_2$ performs 338 a security measure. Responsive to determining 334 a successful protocol, the device enabling module $204_2$ enables 336 the non-enabled device to access data as permitted by the user authentication information for a shorter near-expiry authentication time period measured from the local time of the now enabled device (e.g., Device Bob 224.)

FIG. 4 is a table for illustrating a single sign-on protocol using authentication accumulation for securely propagating authentication between devices using single sign-on in a decentralized network of unsynchronized information technology devices in accordance with an embodiment of the present invention. For illustrative purposes only and not to be limiting thereof, the single sign-on protocol embodiment 400 of FIG. 4 is discussed in the context of the system embodiment of FIG. 2. In FIG. 4, the operator ∥ means concatenation. Symbol $K_G$ is the ensemble or group key, $K_E$ is the enabling key, and $k_{AB}$ is a single-use session key. All the keys are for a symmetric cipher. The symbol $n_i$, represents a nonce, $m_i$ represents an encrypted message, and $a_i$ represents a message authentication code (MAC). As described below, verification of a message authentication code is done to check whether a message has been corrupted during transit between the participant devices. The symbol $I_d$ is a unique device ID used for network addressing, $t_B$ is current local time on Bob, $t_E$ is the near-expiry time. The operation E(k,x) is encryption of x using key k, D(k,m) is decryption of m using key k, and H(k,x) is a MAC function of x using key k. The following are some functions that combine encryption and authentication of messages transferred between devices:

```
pack(k,x) ::=       return(E(k,x), H(k,x))
pack(k,x,c) ::=     return(E(k,x), H(k,x∥c))
unpack(m,a) ::=     x← D(k,m); assert(a=H(k,x)); return x
unpack(m,a,c) ::=   x← D(k,m); assert(a=H(k,x∥c)); return x
```

Different cryptographic algorithms can be used to perform these functions as well as others discussed such as generating random nonces. Some examples that can be used are versions of the Secure Hash Algorithm standards (e.g., SHA-1) based pseudo-random number generation, the Data Encryption Standard (DES) for symmetric encryption using the ensemble key $K_G$, and a Hash-based Message Authentication Code (HMAC) using the SHA-1 hash function (HMAC-SHA-1) for the message authentication.

In this example, the protocol 400 begins with the enabled device Alice 222, and device Bob 224 listening for an authentication message. Both devices have a shared secret ensemble key $K_G$, and each has a unique ID, $I_A$ and $I_B$ respectively. Alice additionally has stored its device-specific enabling key $K_E$ and in this case a near expiry time $t_E$ indicating Alice is not the sign-on device (e.g., 220) but was previously authenticated into the enabled state by another device.

Alice: Known: $(I_A, K_G, t_E, K_E)$
Bob: Known: $(I_B, K_G)$
Alice generates a random nonce as a challenge
$n_A$←random( ).

Alice generates an encrypted version of the message $m_1$ and a message authentication code $a_1$, in this example using a pack function. The nonce $n_A$ and Alice's unique network identifier $I_A$ are concatenated, $(n_A\|I_A)$. In the pack function, the ensemble key $K_G$ is used by a MAC code hash function $H(K_G, n_A\|I_A)$ to produce the message authentication code $a_1$, an example of which is a checksum. Alice encrypts the authentication message $m_1$ using an encryption function (e.g., a different hash function) $E(K_G, n_A\|I_A)$, based on the ensemble key $K_G$ and the concatenation of the nonce $n_A$ and network ID of Alice $I_A$, and communicates (e.g., broadcasts) the authentication message to the ensemble of devices in the network.

Bob receives and authenticates the message the authentication message using an unpack function from which Bob obtains the concatenation of the nonce $n_A$ from Alice and Alice's unique network identifier $I_A$.

$n_A\|I_A$=unpack($K_G$, $m_1$)

In the unpack function, Device Bob decrypts the authentication message $m_1$ using the ensemble $K_G$ to obtain the message contents which in this example are the concatenation of $n_A\|I_A$ $n_A\|I_A$←D($K_G$, $m_1$), and verifies the message has not been corrupted in this example by performing an assertion function in which it compares the received hashed message authentication code $a_1$ with a message authentication code Bob generates from performing a MAC code hash function $H(K_G, n_A\|I_A)$ using the ensemble key $K_G$.

assert($a_{test}$=H($K_G$, $n_A\|I_A$))

If the generated code is the same as $a_1$, this result indicates the message came from a device storing the ensemble key $K_G$ which indicates membership in the same network of ensembled devices. If the codes $a_{test}$ and $a_1$ do not match, Bob would not respond to the message $m_1$.

Upon successful authentication, device Bob generates a random nonce $n_B$ as a challenge to Alice and determines its current time $t_B$.

$n_B$←random( ).
$t_B$←localTime( ).

The reply authentication message Bob prepares includes both Alice's nonce $n_A$ as a response to Alice's challenge and Bob's nonce $n_B$ as well as Bob's local time $t_B$ and Bob's unique network identifier $I_B$. Bob generates a concatenation of the nonces and the local time $n_A\|n_B\|t_B$ and uses the ensemble key $K_G$ to perform a MAC code hash function of the concatenation of the concatenated nonces and local time with the received message authentication code $a_1$ to produce another message authentication code $a_2$ for the reply authentication message $m_2$ $a_2$=H($K_G$, ($n_A\|n_B\|t_B$)$\|a_1$).

The concatenation of nonces and local time $n_A\|n_B\|t_B$ is encrypted using the ensemble key $K_G$ $m_2$=E($K_G$, $n_A\|n_B\|t_B$) thus
$m_2$, $a_2$←pack ($K_G$, $n_A\|n_B\|t_B$, $a_1$).

Bob adds its network identifier $I_B$ to the reply message $m_2$ and sends the encrypted message $m_2$ and the MAC $a_2$ to device Alice.

Alice receives and authenticates the reply authentication message by decrypting the message using the ensemble key and comparing the returned version $n_A'$ of the nonce $n_A$ sent in the authentication message. $n_A'\|n_B\|t_B$←unpack($m_2$, $a_2$, $a_1$)

In the unpack function, Alice decrypts the reply authentication message $m_2$ using the ensemble $K_G$ to obtain the message contents which in this example is the concatenation of $n_A'\|n_B\|t_B$, $n_A'\|n_B\|t_B$←D($K_G$, $m_2$), and verifies the response to its challenge by performing an assertion function in which it compares the received hashed message authentication code $a_2$ with a message authentication code Bob generates from performing a MAC hash function $H(K_G, (n_A'\|n_B\|t_B)\|a_1)$ using the ensemble key $K_G$.

$\text{assert}(a_2 = H(K_G, (n_A'\|n_B\|t_B)\|a_1))$

If the generated code is the same as $a_2$, this result indicates the message came from a device storing the ensemble key $K_G$ which indicates membership in the same network of ensembled devices. If the result does not match $a_2$, Alice stops the protocol with device Bob. Additionally, Alice compares the received nonce $n_A'$ with the original nonce $n_A$ it sent $\text{assert}(n_A' = n_A)$.

If they do not match, Alice stops the protocol with device Bob. If there is a match between them, Alice generates a session key for communicating with device Bob $k_{AB}$ from performing a MAC hash function $H(K_G, a_1\|a_2)$ using the ensemble key $K_G$ $k_{AB} \leftarrow H(K_G, a_1\|a_2)$.

Using Bob's local time $t_B$, Alice determines a near-expiry time period expressed in terms of B's local time $t_E' \leftarrow t_B + t_E - \text{localTime}( )$.

Alice subtracts its current local time returned from a local-Time function (e.g., as can be returned by an operating system call) from its near-expiry time to obtain a near expiry time period which is added to Bob's local time $t_B$ to provide a near-expiry time measured from Bob's local time.

Alice creates an enabling message $m_3$ for Bob including a concatenation of the nonce $n_B$ Bob (a reply to Bob's challenge) sent in Bob's reply authentication message, the device-specific near-expiry time for Bob, and the enabling key using authentication accumulation again and yet another message authentication code $a_3$ for the enabling message $m_3$ using a pack function.

$m_3, a_3 \leftarrow \text{pack}(k_{AB}, n_B'\|t_E'\mathrm{v}K_E, a_2)$.

In the pack function, Alice encrypts the concatenation $n_B\|t_E'\|K_E$ using the session key $k_{AB}$ which Bob can independently generate using the ensemble key $K_G$ as well. The session key $k_{AB}$ prevents man-in-the-middle attacks as only Alice and Bob can independently generate it. Additionally, Alice uses the session key $k_{AB}$ to perform a MAC code hash function of the concatenation of $n_B\|t_E'\|K_E$ and the message authentication code $a_2$ of the reply authentication message $m_2$ from Bob to produce message authentication code $a_3$ $a_3 \leftarrow H(K_G, (n_B'\|t_E'\|K_E)\|a_2)$.

Alice includes its network identifier $I_A$ in the enabling message $m_3$ and sends it and the MAC $a_3$ to Bob.

Upon receipt of the enabling message $m_3$ and its accompanying MAC $a_3$, Bob authenticates the enabling message using an unpack function with the session key $k_{AB}$.

$n_B'\|t_E'\|K_E \leftarrow \text{unpack}(m_3, a_3, a_2)$

In the unpack function, Bob decrypts the enabling message $m_3$ using the session key $k_{AB}$ to obtain the message contents which in this example includes the concatentation of $n_B'\|t_E'\|K_E$, $n_B'\|t_E'\|K_E \leftarrow D(k_{AB}, m_3)$.

Bob verifies the integrity of the message by performing an assertion function in which it compares the received hashed message authentication code $a_3$ with a message authentication code Bob generates from performing a MAC hash function $H(k_{AB}, (n_A'\|n_B\|t_B)\|a_1)$ using the session key $k_{AB}$.

$\text{assert}(a_3 = H(k_{AB}, (n_B'\|t_E'\|K_E)\|a_2))$

If the generated code is the same as $a_3$, this result indicates the message came from a device storing the ensemble key $K_G$ which indicates membership in the same network and from the device which sent the authentication message $m_1$ and received Bob's reply message $m_2$. If the result does not match $a_3$, Bob ignores the enabling message $m_3$. Additionally, Bob compares the Alice's response its challenge, the received nonce $n_B'$, with the original nonce $n_B$ it sent $\text{assert}(n_B' = n_B)$.

If they do not match, Bob ignores the enabling message $m_3$. If there is a match between them, Bob has verified authentication of the enabling message $m_3$ and is in the enabled state so that Bob can now initiate the single sign-on authentication protocol and enable other network devices with which Bob can communicate.

Figure 5:
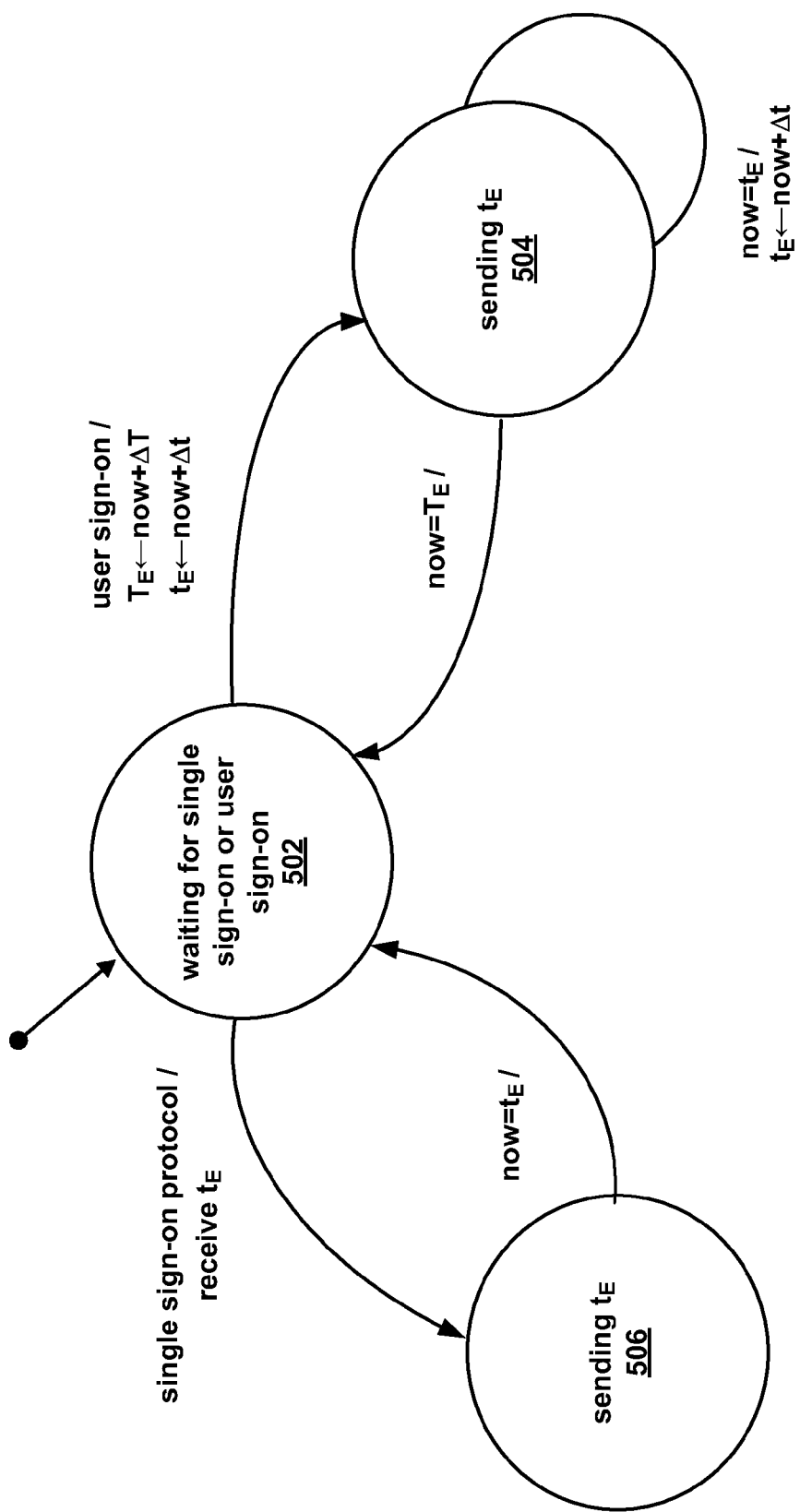
FIG. 5 is a state transition diagram of a participating device in a single sign-on protocol for securely propagating authentication between devices using single sign-on in a decentralized network of unsynchronized information technology devices in accordance with an embodiment of the present invention.

FIG. 5 is a state transition diagram of a participating device in a single sign-on protocol for securely propagating authentication between devices using single sign-on in a decentralized network of unsynchronized information technology devices in accordance with an embodiment of the present invention. FIG. 5 shows the different states a device can go through. In the top state 502, a device is acting in the non-enabled state of the single sign-on authentication protocol while in the right state 504, the device is acting in the role of a sign-on enabled device (e.g., Sign-on Device 220), and while in the left 506 state, the device is acting in the role of an automatically enabled device (e.g., Device Alice 222 or Device Bob 224).

When first turned on, a device is in the non-enabled state 502. If the device is a sign-on capable device, and the user signs on to it, then it transitions to the sign-on enabled state 504 in which it determines and sets the far-expiry (TE) to a fixed time ($\Delta T$) in the future and the near-expiry (tE) to a shorter fixed time ($\Delta t$) in the future. In the sign-on enabled state 504, the device starts attempting to propagate the near-expiry time to other devices. Every time the near-expiry time arrives, the device in the sign-on enabled state 504 resets the near-expiry time for another same fixed short time period in the future. When the far-expiry time arrives, the sign-on enabled state 504 ends and the device moves back to the top non-enabled state 502 waiting to be authenticated by the user or another enabled device.

Alternatively, when it is in the non-enabled state 502, the non-enabled device can participate in a single sign-on authentication protocol with an enabled device and enter the automatically enabled state 506 as a result for no longer than a near-expiry time measured from its local time which near-expiry time was determined by the enabling device.

Figure 6:
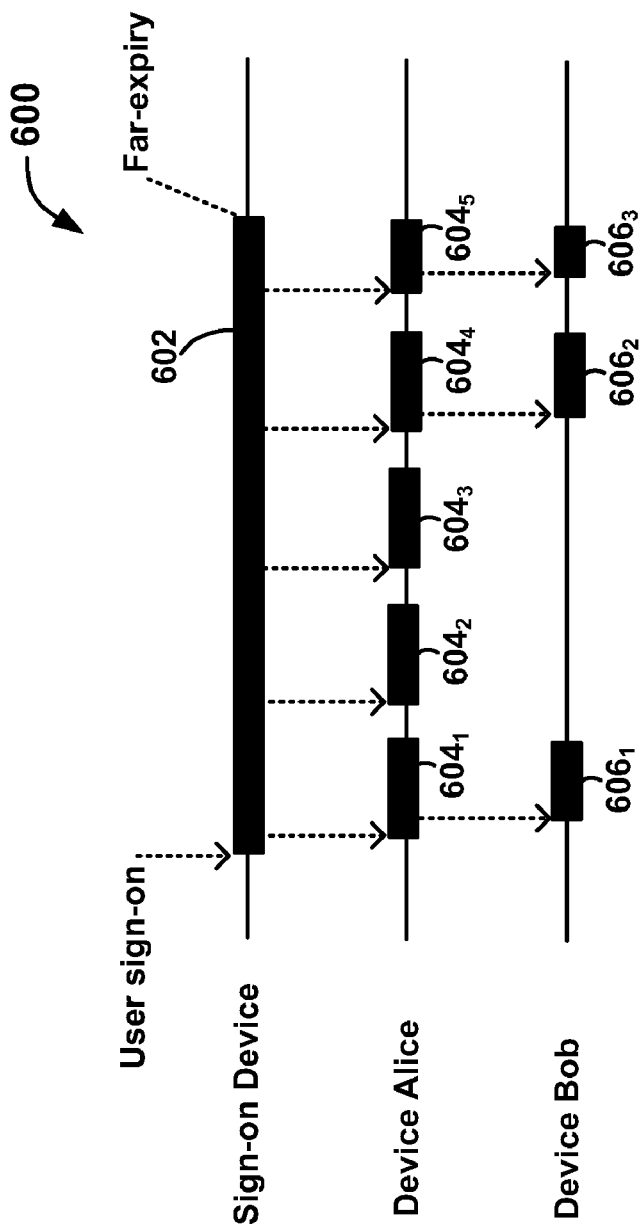
FIG. 6 is a timing diagram illustrating an example of authentication timeout relationships between three devices participating in a single sign-on protocol for securely propagating authentication between devices using single sign-on in a decentralized network of unsynchronized information technology devices in accordance with an embodiment of the present invention.

FIG. 6 is a timing diagram 600 illustrating an example of authentication timeout relationships between three devices participating in a single sign-on protocol for securely propagating authentication between devices using single sign-on in a decentralized network of unsynchronized information technology devices in accordance with an embodiment of the present invention. For illustrative purposes only, FIG. 6 is discussed in the context of FIG. 2. The heavy black lines indicate the periods when the devices are in the enabled state. The Sign-on Device 220 is enabled from the time the user authentication information was verified for the far-expiry time period 602 measured from the local clock time $210_1$ of the Sign-on Device 220. The device enabling module $204_1$ propagates authentication to Device Alice 222 thus enabling Device Alice 222 for an initial near-expiry time period $604_1$. After Device Alice's 222 near-expiry time period $604_1$ expires, the Sign-on device 220 and Device Alice 222 participate in the single sign-on authentication protocol again and gets another near-expiry time period $604_2$ measured from Device Alice's local clock time $210_2$. The re-enabling process repeats after each of the near-expiry time periods $604_3$, $604_4$, and $604_5$ expires during the far-expiry time period 602. Once the far-expiry time period 602 ends, neither the Sign-on Device 220 nor an automatically enabled device (Device Alice 222 or Device Bob 224) can any longer enable another device.

Device Bob 224 can communicate with Device Alice 222 but cannot communicate with Device Sign-On 220 in this example, so Device Bob 224 is indirectly enabled by Device Alice 222. In this example, Device Bob 224 moves out of network range for a while after its first near-expiry time period $606_1$ ends and so misses periodic initiations of the single sign-on authentication protocol from Device Alice 222. This gap in enablement for Device Bob 224 protects its data from someone who might have stolen it and removed it from the network. As indicated in the diagram, the near-expiry time periods $606_1$, $606_2$ and $606_3$ for Device Bob 224 begin slightly after the corresponding near expiry time periods $604_1$, $604_4$, $604_5$ for Device Alice 222, but in any event the near near-expiry time periods $606_1$, $606_2$ and $606_3$ for Device Bob 224 end no later than the near expiry time periods $604_1$, $604_4$, $604_5$ for Device Alice 222, and all the near-expiry time periods, even those $606_1$, $606_2$ and $606_3$ for Device Bob 224 which is unknown to the Sign-on Device 220 in this example, end before the end of the far-expiry time period 602.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the hereto appended claims. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Of course, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming.

Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. In a decentralized network of unsynchronized information technology devices in which membership is defined based on a physical presence within the physical control of a user, a method of securely propagating authentication between devices using single sign-on comprising:

responsive to a first device receiving an authentication code from user input received from a user interface of this first device, selecting a far-expiry time period relative to the device specific time of the first device; and the first device enabling a second device to an enabled state for accessing data as allowed for a user authenticated by the first device for a first near-expiry time period determined relative to a device specific time of the second device and which first near-expiry time period terminates no later than the end of the far-expiry time period.

2. The method of claim 1 further comprising:

enabling a third device to the enabled state for accessing data associated with a user authenticated by the first device for a second near-expiry time period determined relative to a device specific time of the third device and which second near-expiry time period terminates no later than the end of the first near-expiry time period.

3. The method of claim 2 in which the presence of the third device is undetected by the first device.

4. The method of claim 2 in which the third device has no physical user interface for receiving user input directly.

5. The method of claim 2 wherein the second device periodically enables the third device.

6. The method of claim 1 further comprising:

enabling a third device to the enabled state for accessing data associated with a user authenticated by the first device for a second near-expiry time period determined relative to a device specific time of the third device and which second near-expiry time period terminates no later than the end of the far-expiry time period.

7. The method of claim 1 wherein the first device periodically enables the second device.

8. The method of claim 1 wherein the first device automatically initiates re-enabling of the second device after the end of the first near-expiry time period.

9. In a device of a decentralized network of unsynchronized information technology devices in which membership is defined based on a physical presence within the physical control of a user, a system for securely propagating authentication between devices using single sign-on comprising:

an authentication module communicatively coupled to a user interface module for receiving an authentication code from user input received from a physical user interface of the device;

an expiry time period storage module for storing a far-expiry time period measured relative to the device specific time of the device;

a device enabling module communicatively coupled to the authentication module and having access to the expiry time period module, the device enabling module enabling a second device in the network to an enabled state for accessing data as allowed for a user authenticated by the first device for a first near-expiry time period determined relative to a device specific time of the second device and which first near-expiry time period terminates no later than the end of the far-expiry time period.

10. The system of claim 9 wherein the authentication module participates in a single sign-on authentication protocol with a device enabling module of a third device for entry into an enabled state for accessing data as allowed for a user authenticated by the third device for a near-expiry time period determined relative to the device specific time of the first device.

11. The system of claim 9 in which device membership in the network is not predetermined.

12. The system of claim 9 in which the device enabling module enables the second device in the network the enabled state for accessing data as allowed for a user authenticated by the first device further comprises participating in a single sign-on authentication protocol with second device using authentication accumulation.

13. A computer usable medium comprising instructions for causing a processor to execute a method for securely propagating authentication between devices using single sign-on in a decentralized network of unsynchronized information technology devices in which membership is defined based on a physical presence within the physical control of a user, the method comprising:

responsive to receiving an authentication code from user input, selecting a far-expiry time period relative to the device specific time of a sign-on device to which the user input was entered; and enabling a second device to an enabled state for accessing data as allowed for a user authenticated by the sign-on device for a first near-expiry time period determined relative to a device specific time of the second device and which first near-expiry time period terminates no later than the end of the far-expiry time period.

* * * * *